(12) United States Patent
Davis

(10) Patent No.: US 6,222,188 B1
(45) Date of Patent: Apr. 24, 2001

(54) BLACK-OUT CURTAIN

(75) Inventor: David Davis, Little Rock, AR (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/325,925

(22) Filed: Jun. 4, 1999

(51) Int. Cl.[7] .................................................. H04N 17/00

(52) U.S. Cl. .................... 250/330; 250/338.1; 250/472.1

(58) Field of Search ................................ 250/330, 338.1, 250/472.1

(56) References Cited

U.S. PATENT DOCUMENTS 5,608,213 * 3/1997 Pinkus et al. ......................... 250/330

OTHER PUBLICATIONS

Night Vision Equipment Company brochure, particularly p. 23, Covert Illuminators, and others for background.

* cited by examiner

*Primary Examiner*—Constantine Hannaher
*Assistant Examiner*—Andrew Israel
(74) *Attorney, Agent, or Firm*—Marsteller & Associates, P.C.

(57) ABSTRACT

A black-out curtain system (S) reduces undesired viewing by an external observer (O) through an opening (10) in a barrier (12) into an interior space (14). A filter sheet (16) that transmits Electro-Magnetic (EM) radiation (18) is adapted to intercept EM radiation originating in the interior space (14) from exiting the interior space (14) through the opening (10). The filter sheet (16) suppresses EM radiation below a selected cut-off frequency (C), and passes EM radiation above the selected cut-off frequency. An internal night viewer (20) detects only EM radiation having a frequency above the selected cut-off frequency (C). An interior illumination source (22) supplies the interior space (14) EM radiation having a frequency below the selected cut-off frequency (C).

37 Claims, 3 Drawing Sheets

BLACK-OUT CURTAIN

BACKGROUND OF THE INVENTION

1. Technical Field

The invention relates to the field of night vision devices that enable a viewer to observe objects at night or during other low-light conditions. More particularly, this present invention relates to a system to prevent the undesired viewing into an interior space or compartment by an external or outside observer.

2. Background Art

Night vision devices are well known. A common type of a night vision device is based on an image intensification technology and is used to provide soldiers, aviators, and sailors with the ability to view objects at night or during other low light conditions.

A common scenario associated with the use of a night vision device is a soldier using a night viewer, such as a night vision goggle ("NVG") AN/PVS-7 or others, to observe a battlefield scene at night. If the night-time battlefield scene includes people sitting in a vehicle, it is likely that at some point the vehicle occupants will need light to illuminate their compartment to complete operations. Unless otherwise protected, the light source will cast a glow that is visible to the observer outside the vehicle. To prevent or minimize observation by an "unfriendly" soldier using a NVG, a "blackout mode of operation" has been adopted to counteract the observation advantages that the "unfriendly" NVG equipped soldier may have on the battlefield. Consequently, this scenario has prompted a concern with the tactical risk associated with any lighting used in the night vision goggle ("NVG") blackout mode of operation.

Internal lighting for vehicles, aircraft, and naval warships is clearly required to permit continued use of the vehicles in battle while in the blackout mode of operation. In response night viewer compatible flashlights have been provided as one source of lighting. Alternatively, IR illuminators have been provided and incorporated into night vision systems equipment. The IR illuminators provide lighting at a frequency that is not normally observable without NVG. In both cases the lighting poses a genuine and significant tactical threat from enemy night vision devices.

A technology solution is needed to provide illumination within a vehicle also eyeing the issue of tactical risk from the enemy use of night vision devices.

While the above cited known solutions introduce a number of noteworthy advances and technological improvements within the art, none completely fulfills the specific objectives achieved by this invention.

DISCLOSURE OF INVENTION

The present invention is a low-cost black-out curtain system for reducing undesired viewing by an external observer through an opening in a barrier or window and into an interior space, such as a crew compartment of an armored vehicle, an aircraft cockpit, or the bridge of a naval warship.

In accordance with the present invention, a filter sheet that transmits Electro-Magnetic (EM) radiation, also generally known as light, is adapted to intercept EM radiation originating in the interior space from exiting the interior space through the opening. The filter sheet suppresses EM radiation below a selected cut-off frequency while passing EM radiation above the selected cut-off frequency.

An internal night viewer is adapted to detect only EM radiation having a frequency above the selected cut-off frequency. An interior illumination source supplies the interior space with EM radiation having a frequency below the selected cut-off frequency. The filter sheet and interior illumination source cooperate to prevent the external observer from viewing a scene in the interior space through the opening, while at the same time allow the observer in the compartment to use the internal night viewer to view outside of the compartment.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

MODE(S) FOR CARRYING OUT THE INVENTION

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

Figure 1A:
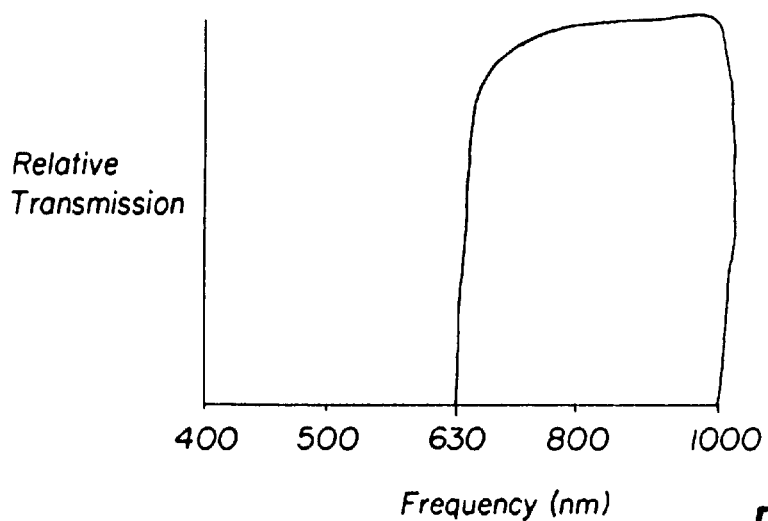
FIG. 1a is a chart showing the relative transmission rate as a function of frequency for the EM radiation being passed through the filter sheet of the present invention.
Figure 1B:
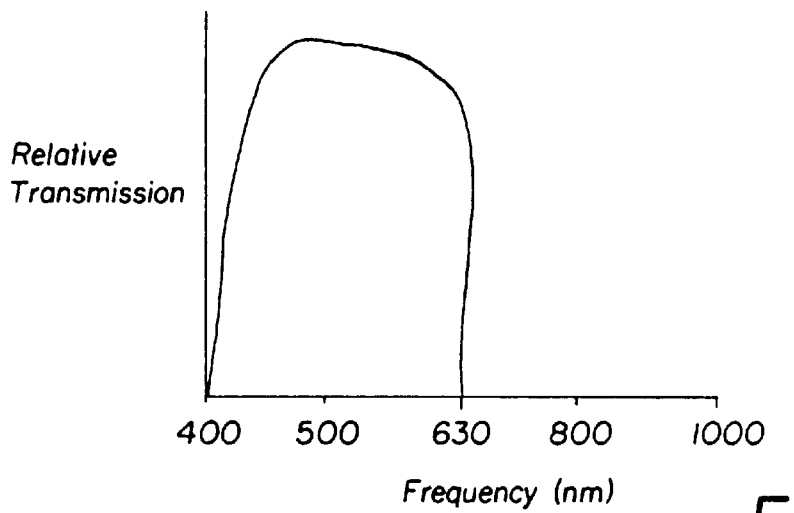
FIG. 1b is a chart showing the relative transmission rate as a function of frequency for the EM radiation being emitted into the interior compartment by the interior illumination source of the present system.
Figure 1C:
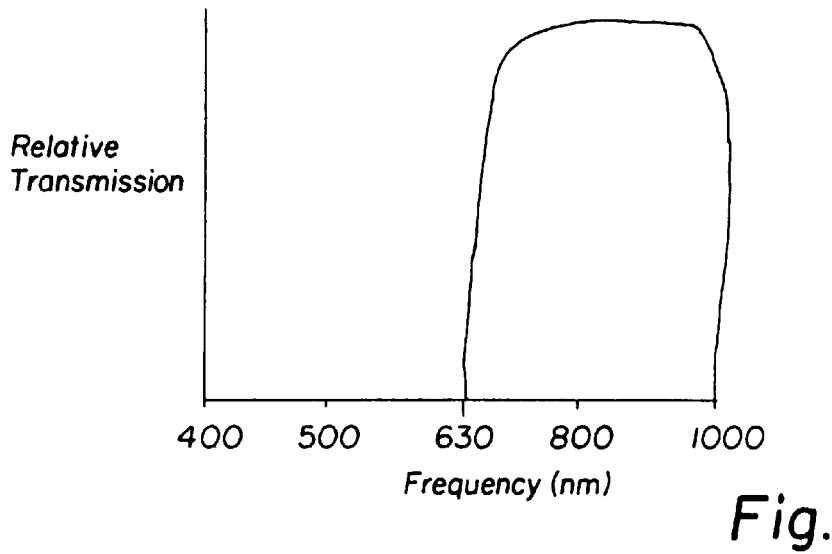
FIG. 1c is a chart showing the relative transmission rate as a function of frequency for the EM radiation being passed through the filter of or being detected by the internal night vision device.
Figure 2:
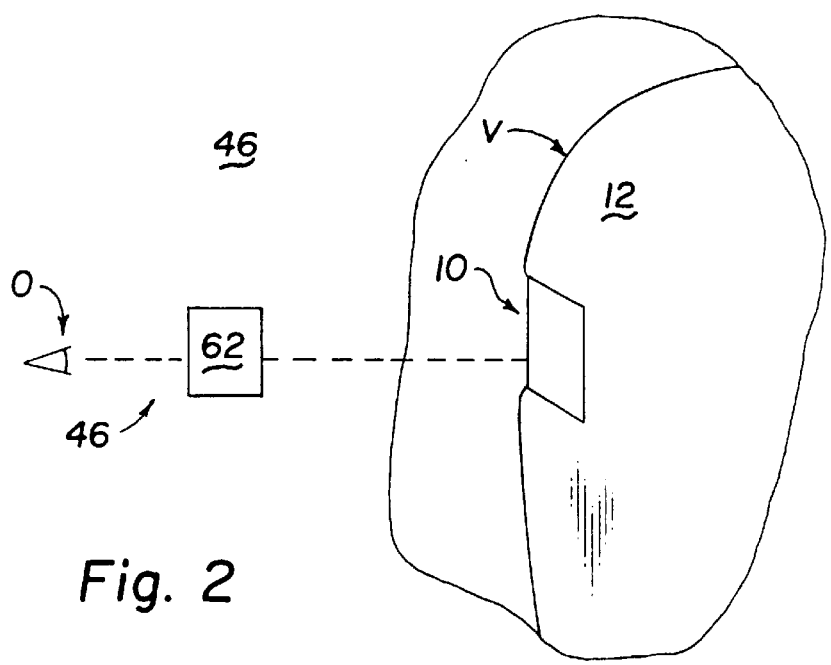
FIG. 2 graphically depicts an external observer using a night vision device attempting to view the interior compartment through the opening in the external barrier shielding the interior compartment.

A black-out curtain system (S) of the present invention reduces undesired viewing by an external observer (O) through an opening (10) in a light impermeable barrier or wall (12) into an interior space (14) or other optically confined area within an envelope. A filter sheet (16) that transmits Electro-Magnetic (EM) radiation (18), also known as light, is adapted to intercept EM radiation (18) originating in the interior space (14) from exiting the interior space (14) through the opening (10). The filter sheet (16) suppresses EM radiation below a selected cut-off frequency (C), see FIGS. 1a–1c, and passes EM radiation above the selected cut-off frequency (C).

An optional internal night viewer (20) is preferably adapted to detect only EM radiation having a frequency above the selected cut-off frequency (C). An interior illumination source (22) supplies the interior space (14) with EM radiation having a frequency below the selected cut-off frequency (C). The filter sheet (16) and interior illumination source (22) cooperate to prevent the external observer (O) from viewing a scene in the interior space or crew compartment (14) through the opening (10).

The opening (10) in the vehicle (V) can be a window in a tank, the bridge of a naval warship, or the canopy for an aircraft cockpit. For instance with a tank, the barrier (12) is the armored exterior or shell of the tank, and the opening (10) is a window or view-port in the outside of the tank visible from the internal crew compartment (24).

The selected cut-off frequency (C) may be chosen depending on the type of threat expected to be faced by the user of the present blackout curtain system and the type of internal night viewer (20). Examples of cut-off frequencies may be in the range approximately 600–680 nm for aviation applications, such as with ANVIS (Aviator's Night Vision Imaging System), or the 580–665 nm range for land based NVG systems, such as an AN/PVS-7 night vision goggle.

The Filter Sheet

The filter sheets (16) preferably are produced from a durable material, such as a high transmission, high-temperature plastic, or other suitable glass or pliable material. Optionally, the panel or filter sheet (16) in such a use can be formed from base material (26) formed from glass or the like and having an external face (28) and an internal face (30), and the filtering element or media (32) being provided as a coating or lamination (34) that is applied to a internal surface (30), for example, of the base (26). See FIG. 3 in which the filter coating (34) is applied to an interior facing surface (30) of a solid panel or sheet (16), which could be the bullet proof glass comprising the tank's window or the canopy of an aircraft.

Generally, the filter sheet (16) is adapted to seal the opening or optically transparent portal (10) from passing substantially any EM radiation (18) through the opening (10) that did not first pass through the filter sheet (16). This could be achieved by having a tightly fit and removable panel (16) that could fit into the frame (36) of the window (10), or as a laminate (34) to the window (10) to be shielded. See FIG. 3.

Requirements for the base coated material (26) are derived from the process conditions and refractive index requirements to achieve the required optical coating performance. Optically coated glass panels (26) could be fabricated using plastic laminations (34) to the base coated glass (26), increasing the panels or filter sheets' (16) durability and resistance to breakage.

Figure 7:
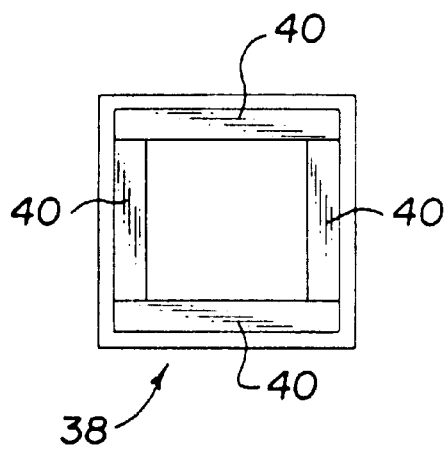
FIG. 7 is a part of a filter sheet adapted to be mounted with the compatible fasteners shown in FIG. 5 or 6.
Figure 6:
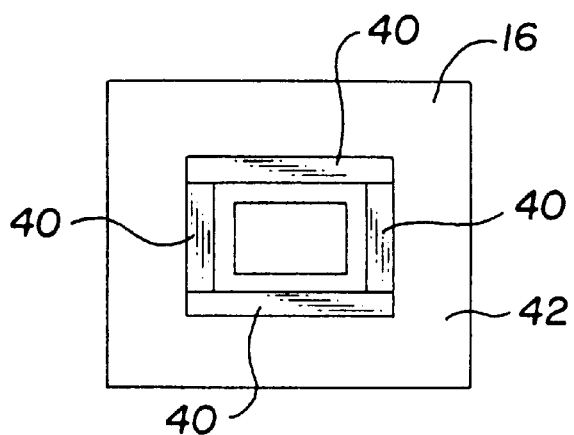
FIG. 6 illustrates a panel having a cut-out portion and fasteners mounted about the cut-out portion.

Because the panels or filter sheets (16) are generally not both day and night compatible, the curtains (16) optionally could be fabricated with panel inserts (38) that are rapidly applied and removed as required. This could be accomplished with known fasteners, such as the hook and loop type fastener (40) having compatible portions of the fasteners on the main panel portion (42) and the removable panel insert (38). See FIGS. 6 and 7.

Figure 5:
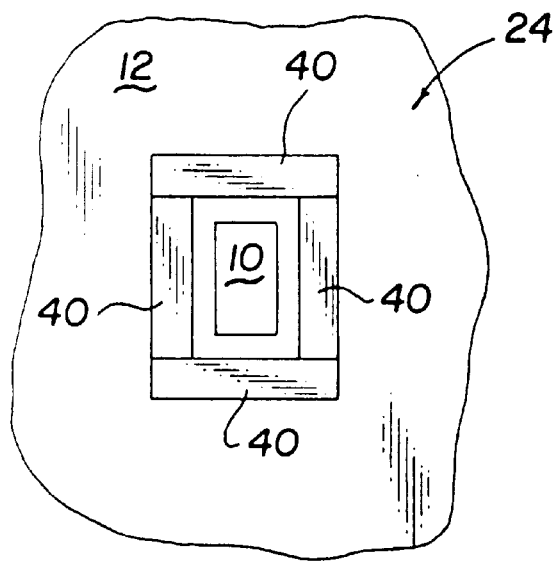
FIG. 5 depicts the interior view of a window in the shell of a tank having hook and loop fasteners mounted about the window.

Referring now to FIG. 5, a portion of the shell of an armored vehicle or other type of vehicle (V) is shown with a window (10) in the exterior or barrier (12). Known type of fasteners (40) are applied about the periphery of the window (10) to cooperate with compatible fasteners attached to the periphery of a filter panel (16) or insert (38). See FIG. 7. In such a manner, the removable panel insert (38) can be rapidly applied to seal the window opening (10) to begin blackout mode, and removed for daytime operation.

Figure 4:
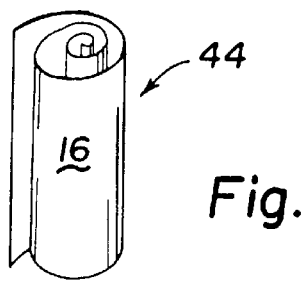
FIG. 4 shows an alternative embodiment of the filter sheet as a removable and pliable shield for covering the window or cockpit canopy.

Stowage in a military vehicle is often a problem. Optionally, the panels (16) can be folded inserted into a container attached the rear of the seats in the vehicle in a known storage scheme. Referring particularly to FIG. 4, the panels (16) desirably can be rolled into tubular bundles (44) such as known types of automotive sun shields or retractable window blinds, depending on the type and suitability of the base material and filter media used.

If the vehicle (V) to being protected is an aircraft, the window (10) can be the canopy of the aircraft with the filter coating (34) applied as a laminate or optical coating.

The results of combining the present blackout panels (16) and the interior space illuminators (22) provides a tactically superior soldier in the night viewer battlefield scenario.

The Internal Night Viewer

Figure 3:
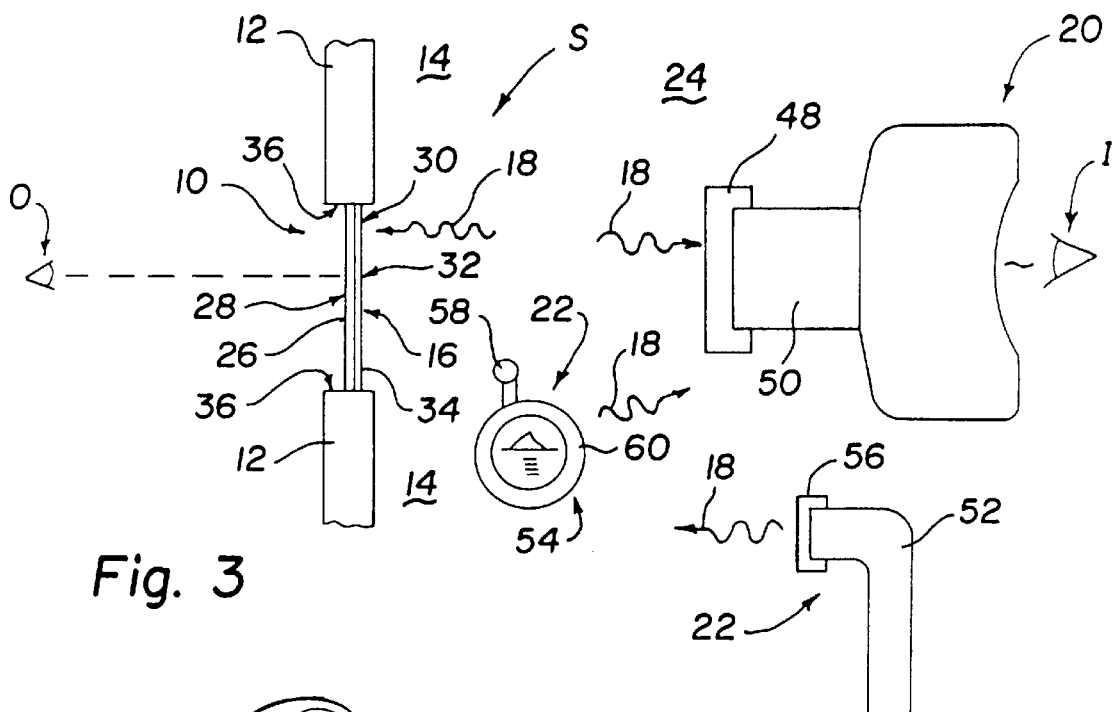
FIG. 3 illustrates the present system in an interior compartment and includes the filter sheet mounted in the opening, an internal night viewer having a detachable filter, and two embodiments of interior illumination sources.

The internal night viewer (20) is selected of the many known types, such as an AN/PVS-7 model. In FIG. 3 an internal observer (I) in the crew compartment (24) uses the internal might viewer (20) to observe an external scene (46) that may include looking at the external observer (O).

When the crew and equipment are in the blackout mode of operation, the internal observer (I) uses the internal night viewer (20) to view outside or the external scene (46). The external scene (46) can be viewed through the window (10) since the internal night viewer (20) is adapted to detect EM radiation above the selected cut-off frequency (C) and the filter sheet (16) through which the internal observer (I) views the external scene (46) passes the essentially same band of EM radiation above the selected cut-off frequency (C). However, when the internal observer (I) needs to operate the equipment located in the crew compartment (24), the internal observer (I) would likely partially or fully removed the internal night viewer (20) in order to see the internal scene lit with light having frequency below the selected cut-off frequency (C), which is generally in the portion of the light spectrum that the human eye can perceive. See the internal illumination source (22) description below.

Preferably, the internal night vision device (20) includes a removable filtering element (48), an internal or fixed optical filter (50), or a suitably designed internal circuitry such that the internal night vision device (20) detects EM radiation having a frequency above the selected cut-off frequency (C). For instance, the removable filtering element (48) can include a filter of the same type used for the filter sheet (16) and is mounted onto the exterior of the optics of the night vision device (20).

The Internal Light Source

There are considerable numbers of alternative internal light sources (22) that can be adapted for use in the black-out system of the present invention. Two examples are a flashlight (52) and illuminated instrumentation or indicator (54), such as an aircraft speed indicator.

If the selected internal light source (22) is chosen to be a flashlight (52) for an individuals use, an external filter (56) that can be removable by the user includes or is formed from filter material adapted to pass light or EM radiation having a frequency below the selected cut-off frequency (C).

Similarly, the illuminated indicator (54) can be lit by a pillar (58) adapted to provide light within the desired frequency band. Alternatively, if the instrument (54) is back-lit, then a fixed or removable covering filter element (60) would pass the light at the desired frequency for illumination purposes.

The Method of Operation

The operation of the present black-out curtain system (S) for reducing undesired viewing by an external observer (O) through an opening (10) or window in a barrier (12) into an interior space (14) includes providing a filter sheet (16) that transmits selected Electro-Magnetic (EM) radiation or light (18) through it. The filter sheet (16) is mounted to intercept EM radiation originating in the interior space (14) from exiting the interior space (14) through the opening (10) or window. The filter sheet (16) is adapted to suppress EM radiation having a frequency below a selected cut-off frequency (C), and to pass EM radiation above the selected cut-off frequency (C).

An optional internal night vision device (20) of a known type, such as an AN/PVS-7, may be used from within the interior space (14) to view through the opening (10) into the area outside (46) of the barrier (12). The internal night vision device (20) is adapted to detect EM radiation having a frequency above essentially the same selected cut-off frequency (C), such as by the use of a mountable filter (48).

The interior space or crew compartment (14) is illuminated with an interior illumination source (22) that is adapted to supply into the interior space (14) with EM radiation having a frequency below the selected cut-off frequency (C) or range.

The cooperation of the filter screen (16) blocking undesired frequencies of light from exiting through the opening (10), and the use of the internal illumination source (22) providing light within the desired range of frequencies permits a viewer (I) in the crew compartment (14) to look out though the opening (10) or aircraft canopy using the internal night viewer (20), and to have sufficient internal light in the crew compartment (14) to perform desired duties. While the internal observer (I) may observe an external scene through the window (10), an outside or external observer (O) using a night viewer (62) cannot see either into the crew compartment (14) through the opening (10) with the mounted filter screen (16) or see a glow from light (18) escaping from the interior (24).

The foregoing disclosure and description of the invention are illustrative and explanatory thereof, and various changes in the size, shape and materials, as well as in the details of the illustrated construction may be made without departing from the spirit of the invention.

What is claimed is:

1. A blackout curtain system for reducing undesired viewing by an external observer through an opening in a barrier into an interior space, the invention comprising:
    a filter sheet transmitting Electro-Magnetic (EM) radiation therethrough, and adapted to intercept EM radiation originating in the interior space from exiting the interior space through the opening;
    said filter sheet suppresses EM radiation having a frequency below a selected cut-off frequency, and passes EM radiation above the selected cut-off frequency;
    an internal night vision device for viewing from within the interior space adapted to detect EM radiation having a frequency above the selected cut-off frequency; and,
    an interior illumination source adapted to supply EM radiation having a frequency below the selected cut-off frequency into the interior space;
    whereby the filter sheet and interior illumination source prevents the external observer from viewing a scene in the interior space through the opening.

2. The invention of claim 1 wherein the selected cut-off frequency is approximately 665 nm.

3. The invention of claim 1 wherein the selected cut-off frequency is approximately 580 nm.

4. The invention of claim 1 wherein the filter sheet is formed from a pliable material.

5. The invention of claim 1 wherein the filter sheet is formed from a glass.

6. The invention of claim 1 wherein the filter sheet is removable from the opening.

7. The invention of claim 1 wherein the filter sheet includes filtering media applied to a surface of the filter sheet to selectively pass desired EM radiation through the filter sheet.

8. The invention of claim 1 wherein said filter sheet is adapted to seal the opening from passing substantially any EM radiation through the opening that did not first pass through the filter sheet.

9. The invention of claim 1 wherein the interior space is an aircraft cockpit.

10. The invention of claim 1 wherein the interior space is the crew compartment of a military type vehicle.

11. The invention of claim 1 wherein the internal night vision device includes an optical filter to pass EM radiation having a frequency above the selected cut-off frequency for detection by the internal night vision device.

12. The invention of claim 1 wherein the internal night vision device includes a removable filtering element to pass EM radiation having a frequency above the selected cut-off frequency for detection by the internal night vision device.

13. The invention of claim 1 wherein the interior illumination source is an indicator device having a removable covering filter element adapted to pass EM radiation having a frequency below the selected cut-off frequency.

14. The invention of claim 1 wherein the interior illumination source is a light having a covering filter element adapted to pass EM radiation having a frequency below the selected cut-off frequency.

15. A blackout curtain for reducing undesired viewing by an external observer through an opening in a barrier into an interior space being controllably illuminated from a source of Electro-Magnetic (EM) radiation having a frequency below a selected cut-off frequency, the blackout curtain comprising:
    a filter sheet transmitting Electro-Magnetic (EM) radiation therethrough, and adapted to intercept EM radiation originating in the interior space from exiting the interior space through the opening; and,
    said filter sheet suppresses EM radiation having a frequency below the selected cut-off frequency, and passes EM radiation above the selected cut-off frequency;
    whereby the filter sheet and interior illumination source prevents the external observer from viewing a scene in the interior space through the opening.

16. The invention of claim 15 wherein the selected cut-off frequency is approximately 665 nm.

17. The invention of claim 15 wherein the selected cut-off frequency is approximately 580 nm.

18. The invention of claim 15 wherein the filter sheet is formed from a pliable material.

19. The invention of claim 15 wherein the filter sheet is formed from a glass.

20. The invention of claim 15 wherein the filter sheet includes filtering media applied to a surface of the filter sheet to selectively pass desired EM radiation through the filter sheet.

21. The invention of claim 15 wherein said filter sheet is adapted to seal the opening from passing substantially any EM radiation through the opening that did not first pass through the filter sheet.

22. The invention of claim 15 wherein the interior space is an aircraft cockpit.

23. The invention of claim 15 wherein the interior space is the crew compartment of a military type vehicle.

24. A blackout method for reducing undesired viewing by an external observer through an opening in a barrier into an interior space, the invention comprising:

providing a filter sheet transmitting Electro-Magnetic (EM) radiation therethrough, and adapted to intercept EM radiation originating in the interior space from exiting the interior space through the opening;

said filter sheet suppresses EM radiation having a frequency below a selected cut-off frequency, and passes EM radiation above the selected cut-off frequency;

viewing through an internal night vision device from within the interior space, the internal night vision device being adapted to detect EM radiation having a frequency above the selected cut-off frequency; and, illuminating the interior space with an interior illumination source adapted to supply EM radiation having a frequency below the selected cut-off frequency into the interior space;

whereby the filter sheet and interior illumination source prevents the external observer from viewing a scene in the interior space through the opening.

25. The blackout method of claim 24 wherein the selected cut-off frequency is approximately 665 nm.

26. The blackout method of claim 24 wherein the selected cut-off frequency is approximately 580 nm.

27. The blackout method of claim 24 wherein the filter sheet is formed from a pliable material.

28. The blackout method of claim 24 wherein the filter sheet is formed from a glass.

29. The blackout method of claim 24 wherein the filter sheet is removable from the opening.

30. The blackout method of claim 24 wherein the filter sheet includes filtering media applied to a surface of the filter sheet to selectively pass desired EM radiation through the filter sheet.

31. The blackout method of claim 24 wherein said filter sheet is adapted to seal the opening from passing substantially any EM radiation through the opening that did not first pass through the filter sheet.

32. The blackout method of claim 24 wherein the interior space is an aircraft cockpit.

33. The blackout method of claim 24 wherein the interior space is the crew compartment of a military type vehicle.

34. The blackout method of claim 24 wherein the internal night vision device includes an optical filter to pass EM radiation having a frequency above the selected cut-off frequency for detection by the internal night vision device.

35. The blackout method of claim 24 wherein the internal night vision device includes a removable filtering element to pass EM radiation having a frequency above the selected cut-off frequency for detection by the internal night vision device.

36. The blackout method of claim 24 wherein the interior illumination source is an indicator device having a removable covering filter element adapted to pass EM radiation having a frequency below the selected cut-off frequency.

37. The blackout method of claim 24 wherein the interior illumination source is a light having a covering filter element adapted to pass EM radiation having a frequency below the selected cut-off frequency.

\* \* \* \* \*